UNITED STATES PATENT OFFICE.

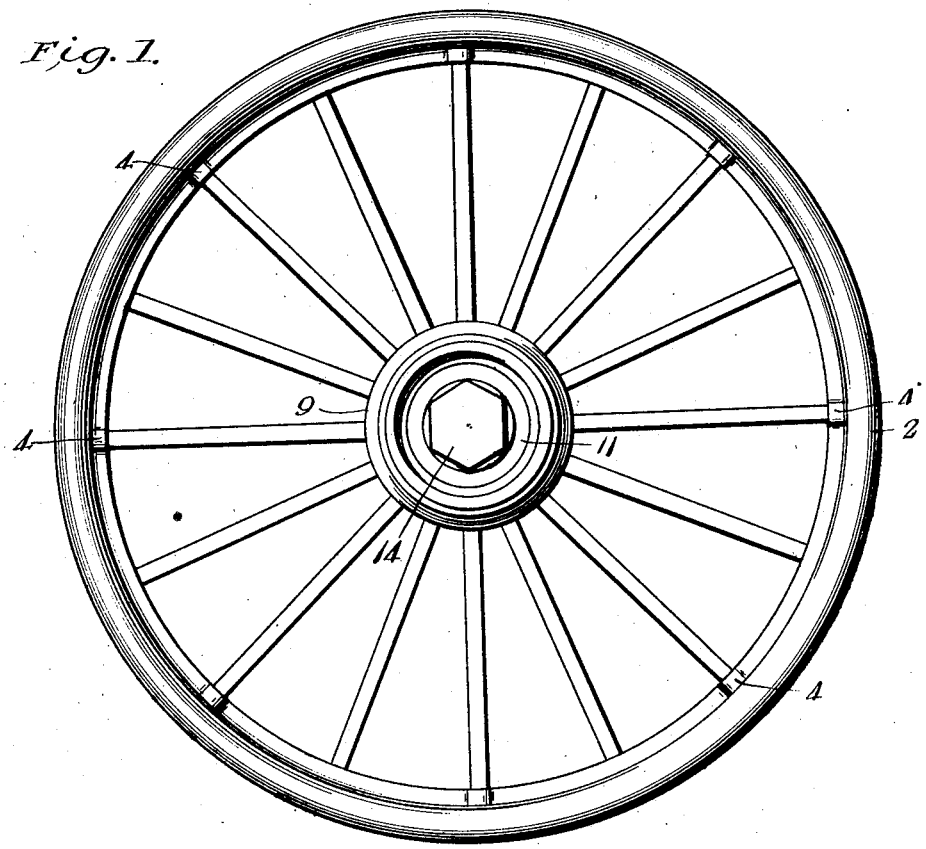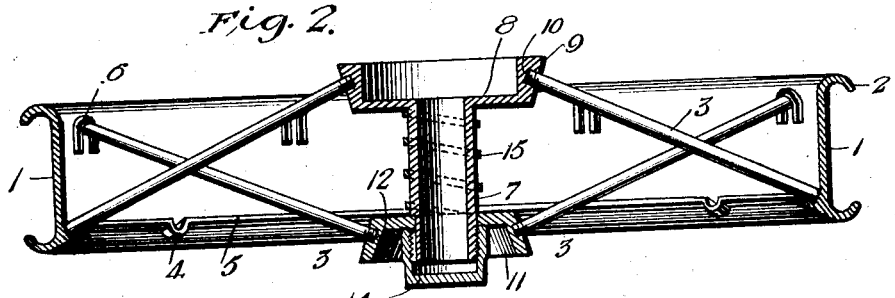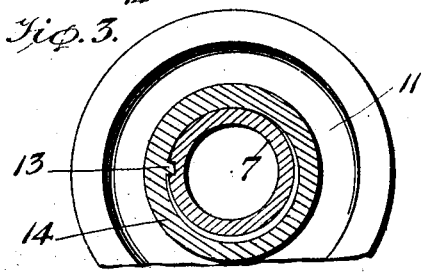

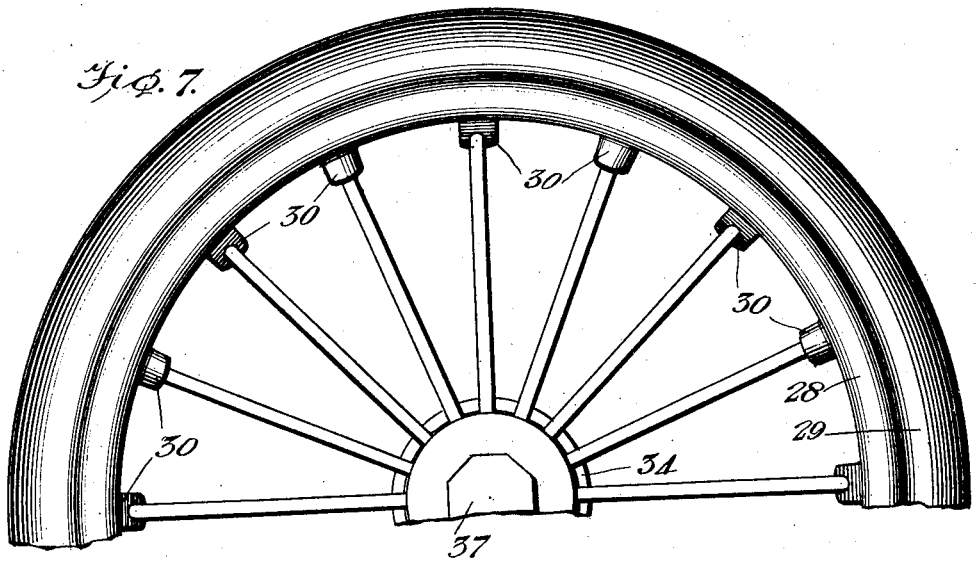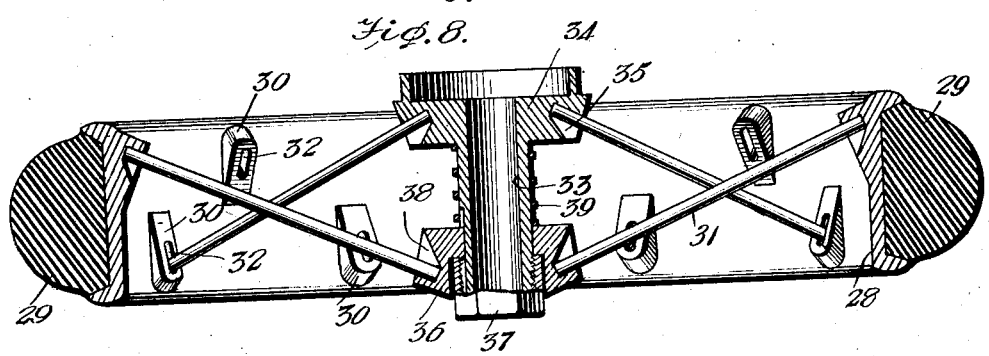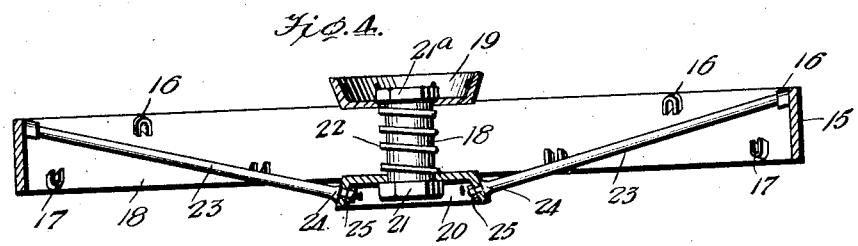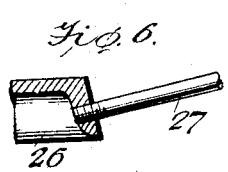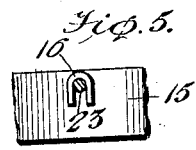

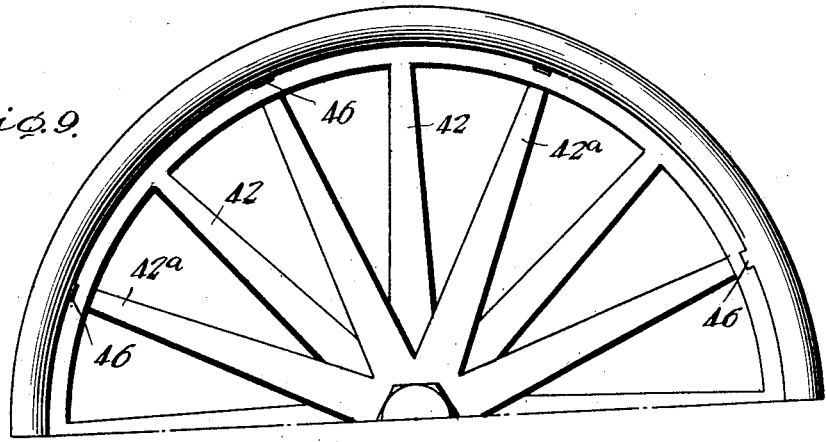
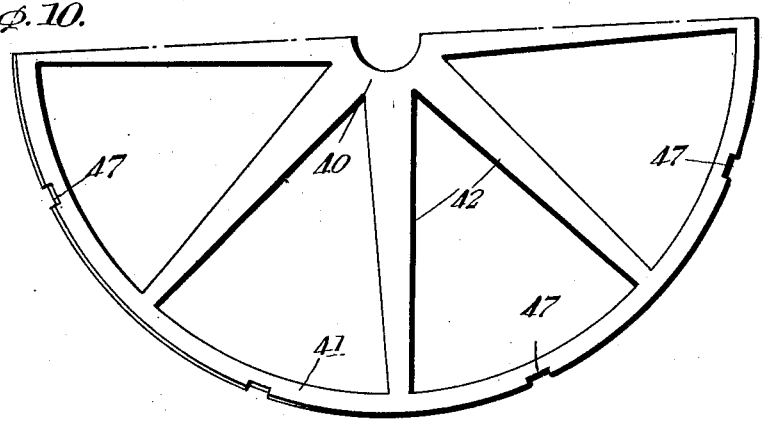
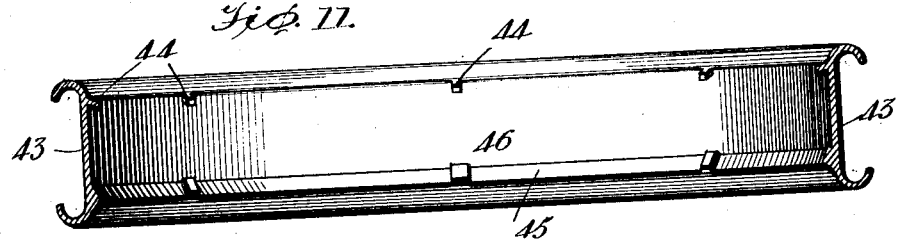
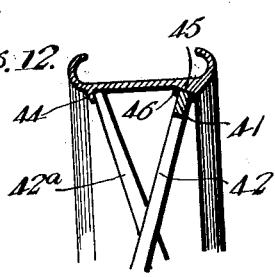

HENRI DANIEL REY, OF AVARUA, ISLAND OF RARATONGA, NEW ZEALAND.

VEHICLE-WHEEL.

1,385,710.   Specification of Letters Patent.   Patented July 26, 1921.

Application filed February 5, 1920. Serial No. 356,538.

*To all whom it may concern:*

Be it known that I, HENRI D. REY, a citizen of the French Republic, and a resident of Avarua, Island of Raratonga, one of the Cook Islands, within the boundaries of New Zealand, have made certain new and useful Improvements in Wheels, of which the following is a specification.

My invention is an improvement in wheels, and has for its object to provide a wheel especially adapted for vehicles, but suitable for wheels of any character, as for instance, pulleys and the like, wherein the spoke portion of the wheel, consists of portions each in the form of connected series of spokes, which are arranged between holding means on the rim and holding means on the hub, the spoke portions being shaped to brace the hub against the rim, the holding means at one end of the hub being adjustable toward and from the means at the other end to tightly clamp the spokes in place.

In the drawings:

Figure 1 is a side view of a wheel constructed in accordance with the invention, Fig. 2 is a central section perpendicular to the plane of the wheel, Fig. 3 is a section on the line 3—3 of Fig. 2, Fig. 4 is a view similar to Fig. 2 of another embodiment of the invention, Fig. 5 is a detail looking at the inner side of the rim showing one of the lugs with the spokes in section.

Fig. 6 is a sectional detail showing another method of connecting the spokes with the hub, Fig. 7 is a partial side view of another embodiment of the invention, Fig. 8 is a section similar to Fig. 2, Fig. 9 is a partial side view of another embodiment of the invention, Fig. 10 is a side view of a part of a series of spokes, Fig. 11 is a diametrical section of the rim.

Fig. 12 is a sectional detail through the rim.

In the embodiment of the invention shown in Figs. 1 to 3 inclusive, the improved wheel comprises a rim 1 which may be of any usual or ordinary construction, so far as concerns the holding flanges 2 for the tire, and this rim has upon its inner face two series of holding means for the spoke 3, the said spoke being in the present instance cylindrical, either solid or tubular, and of any desired cross section.

One of the series of holding means consists of sockets 4, and these sockets are integrally connected to each other by a web 5 which extends entirely around the wheel, the sockets being merely outwardly offset portions of the web. The other series of holding means consists of series of sockets 6, which, like the sockets 4 are U-shaped in horizontal cross section, being open at their inner side. The hub 7 of the wheel at one end has an integral bell, consisting of a radial web 8 and a lateral flange 9, the said flange having its periphery frusto-conical and arranged with its small end inward. This flange 9 has a series of internally threaded openings 10 corresponding in number, and in register when the parts are properly placed, with the lugs 4.

The inner ends of the spokes 3 are threaded to engage these openings 10. At the opposite end of the hub, a bell 11 is mounted, the said bell corresponding in shape to the bell 8—9, and this bell has in its tapering peripheral surface threaded openings 12 for engagement by the threaded ends of the other series of spokes, that is, the series whose outer ends engage the lugs 6.

As shown more particularly in Fig. 3, the hub 7 has a key-way which is engaged by a key 13 on the bell, to prevent angular movement of the bell with respect to the hub, while permitting longitudinal movement of the parts. A cap 14 is threaded onto the outer end of the hub, abutting the bell at its inner end, and a coil spring 15 encircles the hub between the bells 8—9 and 11, the spring acting normally to press the bell 11 away from the bell 8—9.

In use, when it is desired to dislodge a spoke, the cap 14 is loosened, and it will be evident that as the cap is loosened, the bell 11 will be forced away from the bell 8—9, thus loosening the spokes. Any desired spoke may be disengaged from the bell 11, or 8—9 as the case may be, or removed.

It will be understood that a web similar to the web 5 may be provided for connecting the lugs 6 if desired. If so, however, it will be necessary to notch one of the webs for the passage of the spokes when the rim is withdrawn from the spoke sets. The object of the web or webs is to strengthen and reinforce the rim if necessary, also to facilitate assembly by preventing the rim from being overcarried in relation to the engagement of the outer series of lugs by their respective spoke ends.

In Figs. 4, 5 and 6, is shown a modification of the construction of Figs. 1 to 3, especially adapted for ordinary wheels, as for instance, buggy, carriage, or wagon wheels. In this construction, the rim 15 has two series of the lugs 16 and 17 on its inner face, corresponding to the lugs 4 and 6 of Fig. 2.

The hub 18 has the bell 19 at one end corresponding to the bell 8—9 of Fig. 2, and a bell 20 at the other end. This bell 20 is movable longitudinally of the hub, but constrained to rotate therewith in any suitable manner as for instance by a key, and is held in place on the hub by a nut 21. A coil spring 22 is arranged between the bells, and the spokes 23 have their inner ends reduced to pass through openings in the flange of the bell 20. Each spoke has a shoulder 24 between the reduced portion and the body of the spoke for engaging the outer face of the flange, and the reduced portions are engaged by nuts 25 to hold the spokes in place. At their outer ends the spokes engage the lugs 16—17 directly.

If desired, the arrangement shown in Fig. 6 may be substituted for the inner ends of the spokes. In this construction, the flange of the bell 26 has threaded openings which are engaged by the threaded ends of the spokes 27. In Fig. 4 the bells 19 and 20 are independent of the hub 18, being held in place by a head 21ᵃ on the hub and the nut 21.

In Figs. 7 and 8 is shown a construction especially adapted for heavy trucks. With this arrangement the rim 28 which carries the tread 29 has on its inner face two series of lugs 30. Each of these lugs as shown, is of greatest height at the edge of the rim, and gradually decreasing in height toward the center of the rim, and merging with the rim at its inner end. Each lug has on its inclined face a notch or recess for receiving the end of the spoke 31.

The lugs at one edge of the rim are staggered with respect to the lugs at the other edge, and referring to Fig. 8, it will be seen that the notches 32 of the lugs have their inner ends inclined to facilitate the insertion of the spokes. The hub 33 has a bell 34 at one end, which is provided with notches or recesses 35, corresponding to the notches 32 of the lugs 30. At the other end of the hub a bell or flange 36 is provided, the said bell or flange being keyed to the hub and being held in place by a cap 37. This bell or flange 36 has notches 38 similar to the notches 35 for receiving the end of the spoke, and a coil spring 39 encircles the hub between the bells, or flanges 34 and 36.

In Figs. 9 to 12 inclusive, there is shown a construction wherein each series of spokes is an integral structure stamped or otherwise formed from suitable sheet metal. One of the spoke sections comprises a hub portion 40, a rim portion 41, and spokes 42 connecting the hub and rim portions. The other spoke section 42ᵃ is similar to the sections 40, 41, and 42 except that the rim portion 41 is omitted. The rim 43 which may be of any desired construction so far as concerns its external surface is provided at one side edge with a series of inwardly extending lugs 44, and at the other side with a rib 45 whose face is inclined toward the rim, as clearly shown in Figs. 11 and 12. At suitable intervals lugs 46 are provided on this rim, and the rim portion 41 has notches 47 in its outer edge for engaging these lugs to prevent angular movement of the spoke section with respect to the rim.

In assembling the last named type of wheel, the spoke section 40—41—42, is first placed, after which the section 42ᵃ is placed. The notches 47 permit the flange 41 to pass the lugs 44, and the spokes of the sections 42ᵃ are turned out of register with these lugs 44 in order to permit them to pass. Afterward a slight angular movement of the spoke section 42ᵃ will cause the spokes to engage with the lugs 44.

I claim:

1. A wheel of the character specified, comprising a hub and a rim, and spokes between the hub and the rim, said spokes consisting of series oppositely arranged, the members of one series crossing those of the other between the hub and the rim, the rim and the hub having sockets for engagement by the ends of the spokes, the sockets at one end of the hub being carried by a collar feathered on the hub, and resilient means between the collar and the hub, and acting normally to force the collar outwardly.

2. In a wheel of the character specified, a hub and a rim and spokes between the hub and the rim, said spokes being arranged in series, a series between each end of the hub and the opposite side of the rim, and means on the hub and the rim for detachably engaging the ends of the spokes to prevent outward movement away from the hub and the rim respectively, said means comprising sockets for the spoke ends, a collar carrying the sockets at one end of the hub and feathered on the hub for movement toward and from the other series of sockets, a spring between the hub and the collar and normally pressing the collar away from the hub, and means for limiting the outward movement of the collar.

3. A wheel of the character specified, comprising a hub and a rim, and spokes between the hub and the rim, said spokes consisting of series oppositely arranged, the members of each series extending between the hub and the rim and inclining inwardly toward the rim, the rim and the hub having sockets for engagement by the ends of the spokes, the sockets at one end of the hub being carried by a collar feathered on the hub and resilient means between the collar and the hub and acting normally to force the collar outwardly.

4. A wheel of the character specified, comprising a hub and a rim, and spokes between the hub and the rim, said spokes consisting of series oppositely arranged, the rim and the hub having means for engagement by the ends of the spokes, and the spokes of the two series inclining inwardly toward the rim, means movable longitudinally of the hub at one end thereof and carrying sockets at the said end, means for forcing said carrying means toward the other end of the hub, and means acting normally to force said carrying means away from the other end of the hub.

HENRI DANIEL REY.